F. TUREK.
EQUALIZING DEVICE FOR BEER FILTRATION.
APPLICATION FILED FEB. 2, 1910.

973,087.

Patented Oct. 18, 1910.

Witnesses:
Monroe E. Miller
Stedman J. Rockwell

Ferdinand Turek, Inventor,
By Bommhardt & Co.
Attorneys.

UNITED STATES PATENT OFFICE.

FERDINAND TUREK, OF CLEVELAND, OHIO.

EQUALIZING DEVICE FOR BEER FILTRATION.

973,087.  Specification of Letters Patent.  Patented Oct. 18, 1910.

Application filed February 2, 1910. Serial No. 541,551.

*To all whom it may concern:*

Be it known that I, FERDINAND TUREK, a citizen of the United States, residing at Cleveland, in the county of Cuyahoga and State of Ohio, have invented certain new and useful Improvements in Equalizing Devices for Beer Filtration, of which the following is a specification.

This invention relates to apparatus used in the filtration or purification of beer, and has for its object to provide means for causing a steady flow of beer from the chip cask and through the filter, avoiding objections referred to hereinafter.

With the present counter pressure racking apparatus a pump must be used to force the beer from the cask and through the filter to the racking apparatus, inasmuch as there is a counter pressure in the racking apparatus. Ordinarily pumps, located between the chip cask and the filter, cause a variation of pressure in the filter, incident to the pulsations of the pump, and in consequence of this the collected impurity in the filter is agitated, and pounding in the filter allows the loosened yeast with impurities to pass through the filter, thereby increasing the amount remaining in the filtered beer and causing turbidity of the beer when handled in transportation. Also, in the chip cask use is made of chips for separating out and holding the yeast, and often the chips float and the pump when working draws some of the chips out of the cask, as well as some of the attached yeast. The more yeast is drawn from the cask to the filter, the oftener the filter must be cleaned, which is objectionable on account of the time and labor wasted. The present invention is intended to remedy these defects by means of an equalizing device or apparatus which is herinafter described and is illustrated in the accompanying drawings in which—

Figure 1:
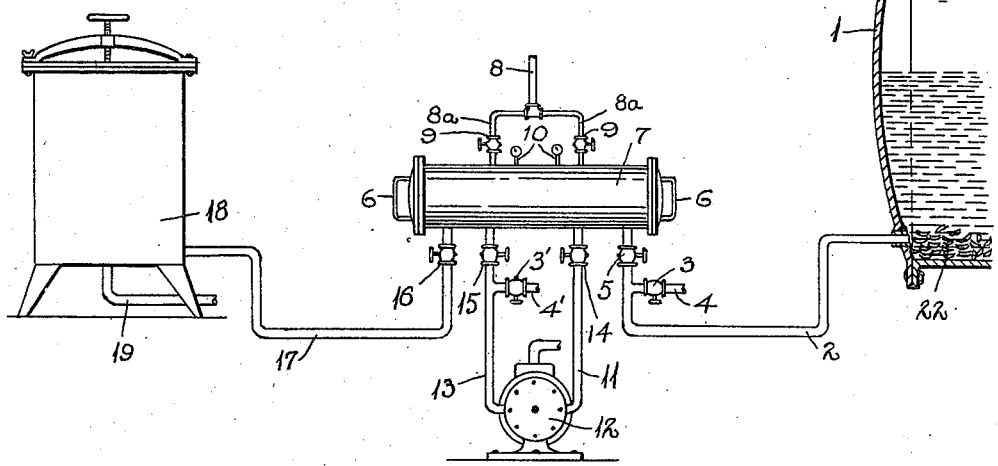
Figure 2:
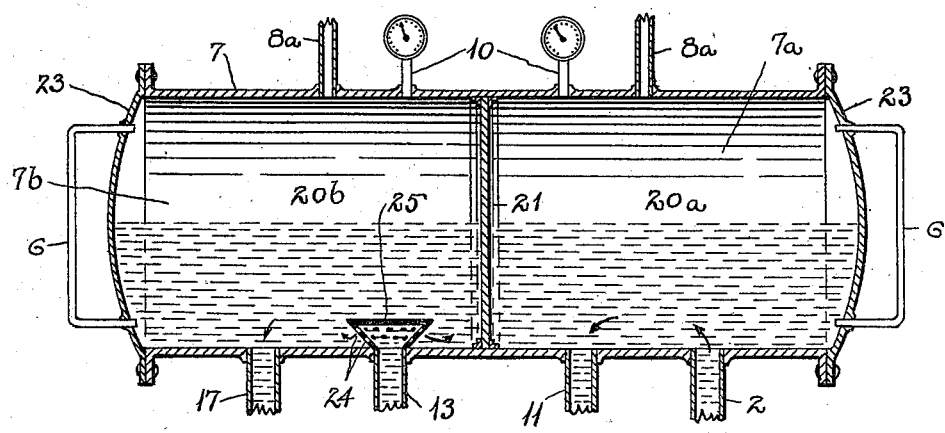

Figure 1 is a side elevation of the apparatus and Fig. 2 is a longitudinal section of the equalizing tank Referring specifically to the drawings, 1 indicates the chip cask from which a pipe 2 leads to one compartment, 20$^a$ of a tank 7. This pipe has a valve 5, as well as a branch 4, for draining, provided with a valve 3. The tank has two compartments 20$^a$ and 20$^b$, the former of which receives the suction of the pump and the latter receives the compression of the pump, the compartments being separated by a partition 21. Instead of one tank with a partition, two tanks may be used. Each compartment has a gage glass 6, as well as a pressure gage 10. Compressed air is admitted into the top of each compartment from a pipe 8, through branches 8$^a$ provided with valves 9.

From the compartment 20$^a$ a pipe 11 leads to the pump 12, and a delivery pipe 13 leads from said pump to the compartment 20$^b$. The pipe 11 has a valve 14, and the pipe 13 has a valve 15, as well as a drain branch 4' with its valve 3'. From the chamber 20$^b$ an outlet pipe 17 extends to the filter 18, the outlet from which is indicated at 19. The pipe 17 has a valve 16. Heads of the tank are indicated at 23, and the delivery end of the pipe 13 is provided with a head 25 perforated as indicated at 24 to spread the beer and steady the flow.

In operation the valve 5 is opened and beer is admitted into the chamber 20$^a$, air pressure being admitted through the pipe 8$^a$, into said chamber, and said compartment is partly filled with beer which flows from the cask, in consequence of the air pressure in the cask, and the difference in head between the liquid in the cask and that in the chamber, until the compression in the chamber balances that in the cask, after which the liquid in the chamber will be maintained at the predetermined level. Then the valve 14 to the pump is opened and the pump draws beer from the chamber 20$^a$ and forces the same into the chamber 20$^b$, against the air pressure therein. Following this, the outlet valve 16 is opened, and in consequence of the pressure in the chamber 20$^b$ the beer is forced through the pipe 17 and the filter.

Inasmuch as the beer is forced from the chip cask by the air pressure therein into the first compartment, the pump cannot draw chips, because it draws from said compartment. The second chamber or compartment 20$^b$, or rather the air therein, absorbs the pulsations and pounding of the pump, and the pressure is equalized and consequently the beer flows in a steady stream to the filter, under constant pressure, and no agitation or disturbance is produced therein. The perforated head 25 also serves to minimize the shocks of the pump.

The number and arrangement of parts may be varied according to local conditions. By the means shown fouling of the pump or its valves is prevented and satisfactory filtration is assured.

What I claim as new is:—

1. In a pressure system for filtering beer or the like, the combination of a chamber under air pressure, to which the beer is supplied, another chamber under air pressure, to which the beer is delivered, a pump having inlet connections from the first mentioned chamber and outlet connections to the last mentioned chamber, a filter, and a supply pipe connecting the latter chamber and the filter.

2. In a pressure system for filtering beer or the like, the combination with a chip cask and filter, of a chamber having an air pressure inlet and a valved connection to the chip cask, a pump with its suction pipe connected to said chamber, an equalizing chamber provided with an inlet for air pressure and an inlet from the delivery pipe of the pump, and a valve pipe connection from the equalizing chamber to the filter.

3. In a pressure system for filtering beer or the like, the combination with a chip cask and filter, of a pump connected therebetween, a chamber between the chip cask and the suction side of the pump, with a valve controlling flow from the chip cask to said chamber, and an equalizing chamber between the delivery side of the pump and the filter.

4. In a pressure system for filtering beer or the like, the combination with a chip cask and filter, of a first chamber having valved pipe connections from the cask and to the suction side of the pump, a second chamber having valved pipe connections from the delivery side of the pump and to the filter, and means to supply compressed air to each of said chambers.

In testimony whereof, I do affix my signature in presence of two witnesses.

FERDINAND TUREK.

Witnesses:
STEDMAN J. ROCKWELL,
MONROE E. MILLER.